United States Patent
Tanaka et al.

(10) Patent No.: US 6,342,193 B1
(45) Date of Patent: Jan. 29, 2002

(54) AMORPHOUS SILICA PARTICLES HAVING A DOUBLE STRUCTURE, PROCESS FOR PRODUCING THE SAME AND USE

(75) Inventors: Masanori Tanaka; Yuuji Washio, both of Chuo-ku (JP)

(73) Assignee: Mizusawa Industrial Chemicals A.S., Tokyo (JP)

( * ) Notice: Subject to any disclaimer, the term of this patent is extended or adjusted under 35 U.S.C. 154(b) by 0 days.

(21) Appl. No.: 09/562,313

(22) Filed: May 1, 2000

Related U.S. Application Data (62) Division of application No. 09/096,165, filed on Jun. 12, 1998, now Pat. No. 6,159,277.

(30) Foreign Application Priority Data

Jun. 13, 1997 (JP) .............................................. 9-171251

(51) Int. Cl.[7] .............................................. C01B 33/12
(52) U.S. Cl. ...................................... 423/338; 423/339
(58) Field of Search .................................. 423/338, 339

(56) References Cited

U.S. PATENT DOCUMENTS

| | | | |
|---|---|---|---|
| 2,885,366 A | 5/1959 | Iler | 423/335 |
| 3,591,518 A | 7/1971 | McMillan | 423/335 |

FOREIGN PATENT DOCUMENTS

| | | |
|---|---|---|
| EP | 0513975 | 11/1992 |
| EP | 0595471 | 5/1994 |
| WO | WO9740106 | 10/1997 |

OTHER PUBLICATIONS

A XP 002078481 Derwent Publications Ltd., Section CH, Week 9130, Class A60 AN 91–218507 Jun. 13, 1991.

*Primary Examiner*—Stuart L. Hendrickson (57) ABSTRACT

The present invention provides the amorphous silica particles having a double structure of a core of the dense amorphous silica and a shell of the bulky amorphous silica, having a volume-based median diameter of from 1 to 5 $\mu$m and containing not more than 10% by volume of fine particles having a particle diameter of not larger than 0.5 $\mu$m. The amorphous silica particles of the double structure have constant particle diameters not only in the powdery state but also in a state where they are blended in a coating material or in a resin, without developing fine particles, exhibit excellent delustering action and antiblocking action, exhibit decreased abrading property, and exhibit excellent resistance against scars or abrasion.

4 Claims, 3 Drawing Sheets

AMORPHOUS SILICA PARTICLES HAVING A DOUBLE STRUCTURE, PROCESS FOR PRODUCING THE SAME AND USE

CROSS-REFERENCE TO RELATED APPLICATIONS

This application is a division of application Ser. No. 09/096,165 now U.S. Pat. No. 6,159,277 filed Jun. 12, 1998.

BACKGROUND OF THE INVENTION

1. (Technical Field of the Invention)

The present invention relates to amorphous silica particles having a double structure, to a process for preparing the same and to the use thereof. More specifically, the invention relates to amorphous silica particles having a double structure of a core of the dense amorphous silica and a shell of the bulky amorphous silica, to a process for preparing the same, and to the use such as delustering agent for the coating materials.

2. (Prior Art)

Coating materials have heretofore been blended with a fine silica powder as a delustering agent in order to lower the luster on the surfaces of the coated films. The delustering agent forms fine ruggedness on the surfaces of the coated film to thereby lower the gloss value.

As delustering silica, there has been used a wet-method silica, i.e., a wet-method silica obtained by neutralizing the sodium silicate with an acid. For example, Japanese Patent Publication No. 6669/1980 discloses a delustering composition comprising a fine powdery silica having a refractive index of larger than about 1.448 and an ignition loss of smaller than 2%, that is obtained by treating the ordinary wet-method silica with heat at a temperature of not lower than about 800° C.

Japanese Laid-Open Patent Publication No. 298014/1989 discloses a process for producing a delustering agent for coating materials, obtained by pulverizing wet-method silica until its average particle diameter becomes from 1 to 20 μm followed by the heat treatment at a temperature of from 400 to 1000° C. for 30 to 120 minutes.

Japanese Laid-Open Patent Publication No. 289670/1990 discloses a delustering agent comprising an inorganic hydrogel having a porous volume of at least 1.0 ml/g, an average particle size of from 1 to 10 microns, and a specific particle size distribution of when it is dispersed in a coating vehicle.

Furthermore, Japanese Laid-Open Patent Publication No. 117548/1993 discloses a delustered coating composition containing a fine silica powder and resin particles having a positive ζ-potential and an average particle diameter of from 0.01 to 5 μm.

Moreover, Japanese Laid-Open Patent Publication No. 166091/1995 discloses a delustering agent for coating materials obtained by treating the surfaces of the wet-method precipitation silica with a polyethylene wax, and having a BET specific surface area of from 30 to 150 m$^2$/g, an oil-absorbing amount of from 120 to 280 ml/100 g, a bulk density of from 30 to 150 g/l, and an average particle diameter of secondary particles of from 1.0 to 5.0 μm, the amount of the polyethylene wax being from 4 to 12 parts by weight per 100 parts by weight of the wet-method precipitation silica.

The fine silica powder that has heretofore been used as the delustering agent comprises shapeless secondary particles which are formed by the aggregation of primary particles having fine particle diameters. Therefore, the particle shapes are indefinite, particle sizes are widely distributed and the particles are asymmetric. In a state of being dispersed in a coating material, furthermore, it is difficult to control the diameter of the particles that are dispersed.

That is, a predetermined limitation is imposed on the diameter of the silica particles that work to effectively lower the luster by forming ruggedness on the surface of the coated film. The particles smaller than the effective particle diameter are not effective in decreasing the luster on the surface of the coated film, and the particles larger than the effective particle diameter form lumps on the surface of the coated film to deteriorate the appearance and surface properties of the coated film. Besides, in the conventional silica-type delustering agent, the content of the particles larger than the above-mentioned effective particle diameter can be decreased by pulverization or classification accompanied, however, by an increase in the content of the particles having diameters smaller than the effective particle diameter, causing inconvenience to take place as described below.

First, the content of the particles having the effective particle diameters helpful for decreasing the luster on the surface is small and, hence, the amount of blending the silica-type delustering agent must be increased per the coating material, requiring an increased cost and cumbersome blending operation. Moreover, with the particles having diameters smaller than the effective particle diameter being contained in the coating material, the viscosity of the coating material increases causing the efficiency of coating operation to decrease. Besides, the presence of particles of small diameters in the coating material causes the hue of the coated film to become dark and dull, and further causes mechanical properties such as toughness of the coated film to be deteriorated. Furthermore, the coated film containing aggregated particles of small diameters tends to be scarred on the surface due to friction.

The conventional shapeless silica-type delustering agent may have a particle constitution that is satisfactory to some extent before being blended. When dispersed in the coating material, however, the conventional shapeless silica-type delustering agent tends to be collapsed (disintegrated) due to the shearing force, and are not capable of avoiding the above-mentioned defects.

Amorphous silica has another defect in that it causes abrasion and gives scars; i.e., the device for handling the coating material is abraded, and the coating material gets scarred when it is abraded. The slipping property can be improved when the surfaces of the amorphous silica particles are treated with a polyethylene wax or the like as proposed in the foregoing without, however, radically solving the above-mentioned problems.

Such defects of the amorphous silica are not confined simply in the delustering agent for coating materials but also occur similarly even when the amorphous silica is used as an antiblocking agent for the resin films.

SUMMARY OF THE INVENTION

It is, therefore, an object of the present invention to provide amorphous silica particles having a novel structure free from the above-mentioned problems, maintaining constant particle diameters not only in the powdery state but also in a state where they are blended in a coating material or in a resin, without developing fine particles, exhibiting excellent delustering action and antiblocking action, exhibiting decreased abrading property, and exhibiting excellent resistance against scars or abrasion.

Another object of the present invention is to provide a method capable of easily preparing the amorphous silica particles having the above-mentioned novel structure maintaining excellent productivity and economically.

A further object of the present invention is concerned to the use of the amorphous silica particles having the above-mentioned novel structure and, particularly, to provide a delustering agent for coating materials and an antiblocking agent for films.

According to the present invention, there are provided amorphous silica particles having a double structure of a core of the dense amorphous silica and a shell of the bulky amorphous silica, having a volume-based median diameter (average particle diameter) of from 1 to 5 $\mu$m and containing not more than 10% by volume of fine particles having a particle diameter of not larger than 0.5 $\mu$m.

In the amorphous silica particles of the present invention, it is desired that:
1. a BET specific surface area is from 150 to 400 $m^2/g$ and a BET porous volume is from 0.2 to 2 ml/g;
2. the cores of the dense amorphous silica and the shells of the bulky amorphous silica are contained at a weight ratio of from 2:8 to 7:3 and, particularly, from 3:7 to 5:5;
3. the cores of the dense amorphous silica are gel-method amorphous silica particles, and the shells of the bulky amorphous silica are precipitation-method amorphous silica particles precipitated on the surfaces of said core particles;
4. the cores of the dense amorphous silica has a BET specific surface area of from 200 to 800 $m^2/g$, a BET porous volume of from 0.2 to 2 ml/g, and a porous volume distribution in which a porous volume of pores having radii of from 10 to 150 angstroms is from 40 to 80% of the whole porous volume.

According to the present invention, furthermore, there is provided a process for preparing amorphous silica particles having a double structure comprising:
  a step of neutralizing an alkali silicate aqueous solution and a mineral acid aqueous solution under a condition of a pH of from 2 to 10 to prepare gel-method amorphous silica;
  a step of wet-pulverizing the thus formed gel-method amorphous silica; and
  step of neutralizing the alkali silicate aqueous solution and the mineral acid aqueous solution in the presence of the wet-pulverized gel-method amorphous silica particles under a condition of a pH of from 5 to 9, so that the precipitation-method amorphous silica particles are precipitated on the surfaces of the gel-method amorphous silica particles.

In the process of the present invention, it is desired that:
1. the gel-method amorphous silica particles are prepared at a temperature of not higher than 50° C.;
2. the gel-method amorphous silica is wet-pulverized so that the volume-based median diameter becomes from 0.5 to 3 $\mu$m; and
3. the precipitation-method amorphous silica particles are precipitated at a temperature of from 60 to 100° C.

According to the present invention, furthermore, there are provided a delustering agent for coating materials and an antiblocking agent for films, comprising the above-mentioned amorphous silica particles.

DETAILED DESCRIPTION OF PREFERRED EMBODIMENTS OF THE INVENTION

Figure 1:
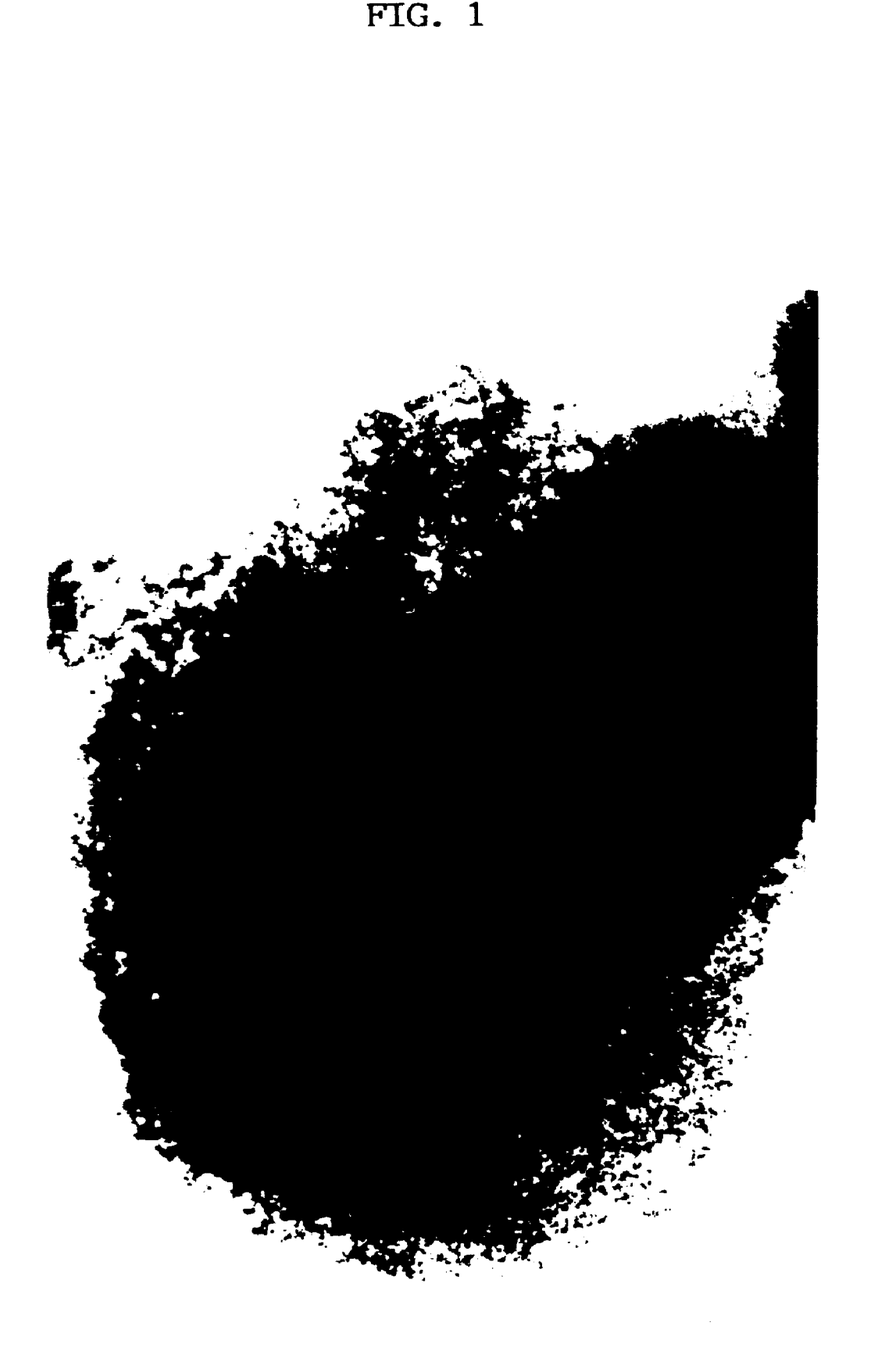
FIG. 1 is a transmission-type electron microphotograph (magnification of 30,000 times) of an amorphous silica particle having a double structure according to Example 1 of the present invention.
Figure 2:
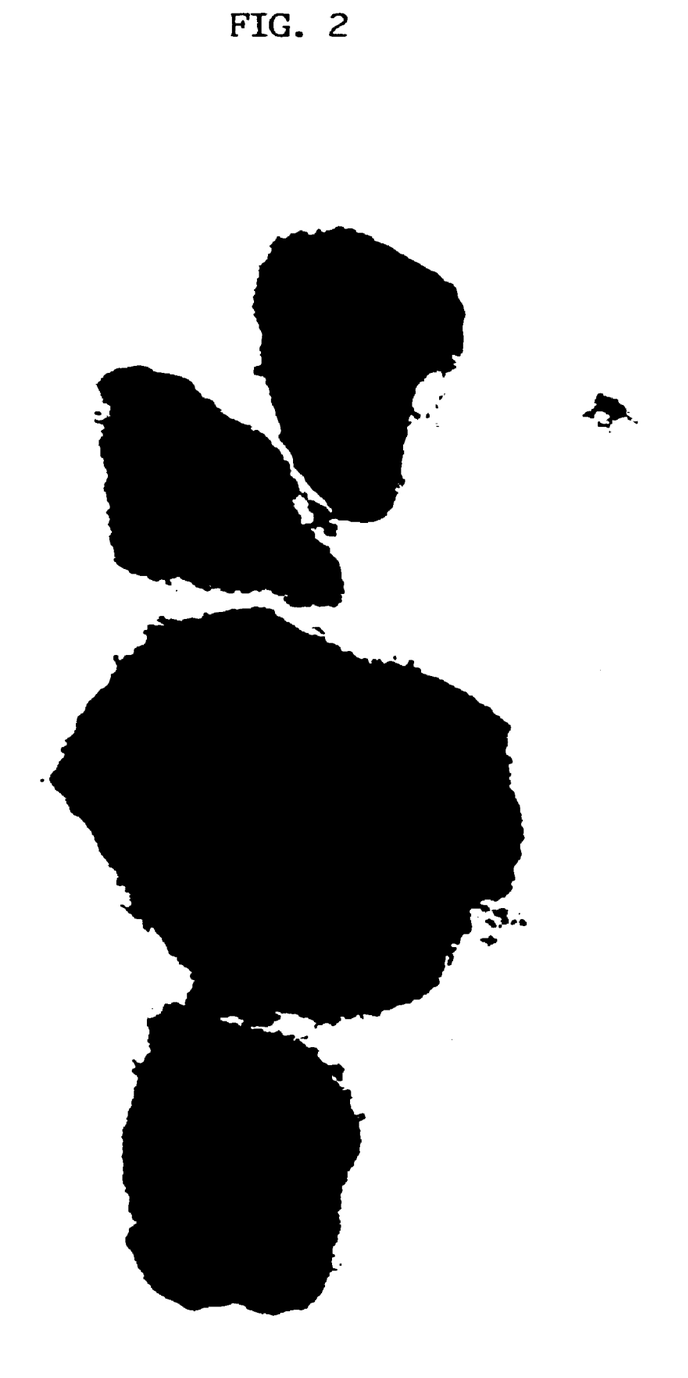
FIG. 2 is a transmission-type electron 25 microphotograph (magnification of 30,000 times) of gel-method amorphous silica particles.
Figure 3:
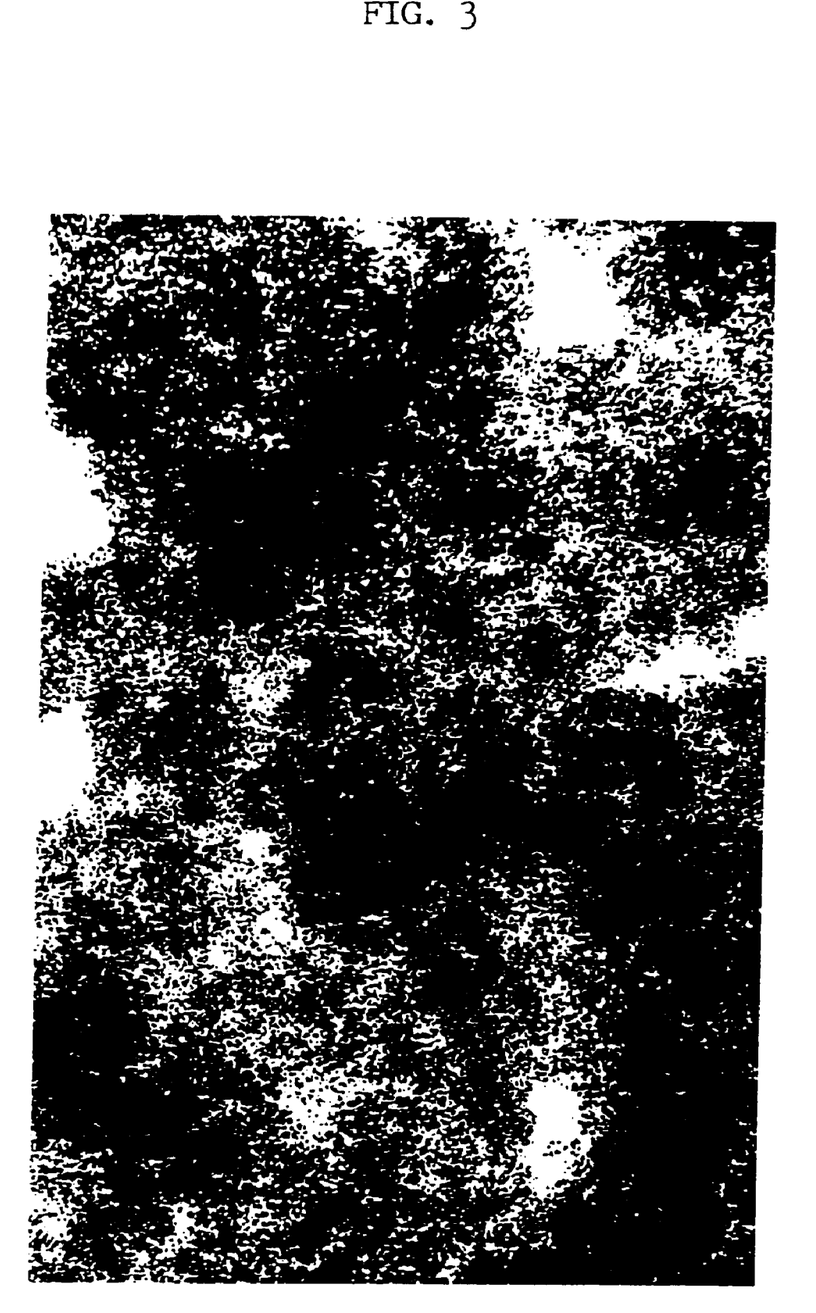
FIG. 3 is a transmission-type electron microphotograph (magnification of 30,000 times) of precipitation-method amorphous silica particles.

[Amorphous Silica Particles of a Double Structure]
(1) The amorphous silica particles of the present invention have a feature in that they have a double structure of a core of the dense amorphous silica and a shell of the bulky amorphous silica. The double structure is confirmed upon observing the amorphous silica particles using a transmission-type electron microscope.
(2) FIG. 1 in the attached drawings is a transmission-type electron microphotograph of an amorphous silica particle having a double structure according to the present invention, FIG. 2 is a transmission-type electron microphotograph of gel-method amorphous silica particles for comparison, and FIG. 3 is a transmission-type electron microphotograph of precipitation-method amorphous silica particles for comparison. It will be understood from this comparison that the amorphous silica particle having a double structure of the present invention includes a core of the dense amorphous silica at the center and has, in the periphery thereof, a covering (shell) of the bulky amorphous silica that appears like a floss.
(3) In the present invention, the dense amorphous silica works to enhance the strength of the particles, to prevent the particles from collapsing or from being powdered and, besides, works to improve refractive index of the particles to enhance transparency. On the other hand, the bulky amorphous silica exhibits delustering action, antiblocking action, and improves resistance against abrasion and scars.
(4) However, when a coating material or a resin is blended with the dense amorphous silica particles, neither the delustering action nor the antiblocking action is exhibited to a satisfactory degree. Besides, the abrading tendency becomes conspicuous, and the film or the coating tends to be scarred by abrasion to a conspicuous degree (see Comparative Example 2 appearing later). When the coating material or the resin is blended with the bulky amorphous silica, on the other hand, the delustering action and the antiblocking action are exhibited to some extent. However, the coating material and the resin tend to exhibit an increased viscosity, and the transparency is deteriorated (see Comparative Example 3 appearing later). This is attributed to that the bulky amorphous silica particles collapse (disintegrate) the particles to decrease the ratio of the particles having diameters that effectively work for exhibiting delustering action and antiblocking action, and that fine particles formed by the collapse increase the viscosity. The above-mentioned tendencies are recognized even when the dense amorphous silica and the bulky amorphous silica are simply mixed together (see Comparative Example 4).
(5) On the other hand, when the amorphous silica particles have a double structure by using the dense amorphous silica as cores and the bulky amorphous silica as shells, ① the particle diameter remains constant not only in the powdery state but also in the state of being blended in the coating material or in the resin, without forming fine particles, ② excellent delustering action and antiblocking action are exhibited, the abrading tendency is exhibited little, and excellent resistance is exhibited against scars and abrasion, and ③ the coating material or the resin composition blended with amorphous silica particles exhibits excellent transparency and deep appearance (see Example 1).

(6) The reasons are attributed to that the shells of the bulky amorphous silica work to enhance the delustering action and antiblocking action, to decrease the abrasion tendency and to improve resistance against being scarred, and the cores of the dense amorphous silica work to prevent the particles from being collapsed or becoming powdery, and maintain the size of the amorphous silica particles in a range which is most suited for exhibiting the delustering action and antiblocking action, suppressing an increase in the viscosity caused by a powder and contributing to improving the transparency.

(7) In the amorphous silica particles of the present invention, it is important that the volume-based median diameter is from 1 to 5 μm and the content of fine particles having particle diameters of not larger than 0.5 μm is not larger than 10% by volume. This is because, with the median diameter lying within the above-mentioned range, the delustering action and antiblocking action are exhibited to a maximum degree with a small blending amount. By suppressing the content of fine particles to be not larger than the above-mentioned range, furthermore, it is allowed to suppress the viscosity of the blended coating material or resin.

(8) In relation to the above-mentioned double structure, the amorphous silica particles of the present invention have a BET specific surface area of from 150 to 400 $m^2/g$ and a BET porous volume of from 0.2 to 2 ml/g. When the specific surface area is smaller than the above-mentioned range, the transparency tends to decrease. When the specific surface area is larger than the above-mentioned range, on the other hand, the strength of the particles tends to decrease. When the porous volume is greater than the above-mentioned range, the strength of the particles tends to decrease. When the porous volume is smaller than the above-mentioned range, on the other hand, the abrasion tends to increase.

(9) In the amorphous silica particles of the present invention, it is desired that the cores of the dense amorphous silica and the shells of the bulky amorphous silica exist at a weight ratio of from 2:8 to 7:3 and, particularly, from 3:7 to 5:5 from the standpoint of maintaining balance of the above-mentioned properties. When the amount of cores of the dense amorphous silica is smaller than the above-mentioned range, the tendency of turning into a powder increases and the transparency decreases. When the amount of shells of the bulky amorphous silica is smaller than the above-mentioned range, the delustering action and antiblocking action decrease, and the abrasion tendency increases.

(10) In the amorphous silica particles of the present invention, it is desired from the standpoint of preparation that the cores of the dense amorphous silica are gel-method amorphous silica particles and the shells of the bulky amorphous silica are precipitation-method amorphous silica particles precipitated on the surfaces of the core particles. However, the amorphous silica particles of the present invention are in no way limited to those prepared by the above-mentioned method, as a matter of course.

(11) It is further desired that the cores of the dense amorphous silica have a BET specific surface area of from 200 to 800 $m^2/g$, and the porous volume of those having porous radii of from 10 to 150 angstroms is from 0.2 to 2 ml/g. Within these ranges, the shells of the bulky amorphous silica are formed most smoothly and reliably, and various actions are excellently exhibited in combination.

[Preparation of Amorphous Silica Particles of a Double Structure]

(1) A process for preparing amorphous silica particles of a double structure according to the present invention comprises (A) a step of neutralizing an alkali silicate aqueous solution and a mineral acid aqueous solution under a condition of a pH of from 2 to 10 to prepare gel-method amorphous silica, (B) a step of wet-pulverizing the thus formed gel-method amorphous silica, and (C) a step of neutralizing the alkali silicate aqueous solution and the mineral acid aqueous solution in the presence of the wet-pulverized gel-method amorphous silica particles under a condition of a pH of from 5 to 9, so that the precipitation-method amorphous silica particles are precipitated on the surfaces of the gel-method amorphous silica particles.

(2) In the step (A), a silica gel of a homogeneous composition is prepared by the neutralization reaction under the above-mentioned pH value condition, and is subjected to the wet pulverization in the step (B) to prepare core particles having homogeneous diameters. In the step (C), the neutralization reaction is carried out within the above-mentioned pH range in the presence of the core particles to reliably form shells of the bulky amorphous silica on the surfaces of the core particles, permitting free bulky amorphous silica particles to be formed very little.

(3) In the process of preparation of the present invention, it is desired that the gel-method amorphous silica particles are prepared at a temperature of not higher than 50° C. from the standpoint of forming gel-method silica of a homogeneous composition. The silica particles using cores prepared under this condition exhibit excellent properties, too.

(4) It is further desired that the gel-method amorphous silica is wet-pulverized such that the volume-based median diameter becomes from 0.5 to 5 μm. The amorphous silica particles of the double structure using, as cores, the gel-method amorphous silica particles that are not wet-pulverized, exhibit poor delustering action and antiblocking action and conspicuous abrasion tendency.

(5) It is further desired that the precipitation-method amorphous silica particles are precipitated at a temperature of from 60 to 100° C. This makes it possible to prepare amorphous silica particles having a double structure exhibiting excellent delustering action, antiblocking action and resistance against abrasion while preventing the precipitation of free bulky amorphous silica, maintaining good yield and reproduceability.

(Preparation of Gel-Type Amorphous Silica)

To prepare a slurry of silica hydrogel, an alkali silicate aqueous solution and an acid aqueous solution are reacted together to prepare a silica hydrogel, first.

The alkali silicate which is a starting material will be sodium silicate or potassium silicate such as water glass or the like that have been specified under JIS as industrial products, or alkali silicate obtained by reacting a reactive silica recovered from a starting clay such as acidic clay with a hydroxide solution of an alkali metal. It is desired that the alkali silicate aqueous solution has an $SiO_2$ concentration of from 6 to 28% by weight, and that the molar ratio of $SiO_2:M_2O$ (M is an alkali metal) is, generally, from 2:1 to 4:1 and, particularly, from 2.5:1 to 3:1.

Generally, the mineral acid used for the neutralization reaction will be hydrochloric acid or sulfuric acid. However, there can be used a mixture acid thereof. The concentration of the mineral acid aqueous solution is generally from 10 to 75% by weight and, particularly, from 20 to 60% by weight.

The neutralization reaction by the contact of the two starting materials is accomplished by a method in which either one of the two starting materials is added into the other solution with stirring, or by a method in which the two starting material solutions are simultaneously contacted under the predetermined conditions. Though there is no particular limitation, the neutralization temperature is generally not higher than 50° C., and the pH at the end of the neutralization is from 4 to 7.

A hydrosol of silica is formed through the neutralization. After left to stand for more than 30 minutes, in general, the hydrosol is inverted into a hydrogel.

The $SiO_2$ concentration in the thus formed hydrogel is usually as low as from 5 to 30% by weight. According to the present invention, the hydrogel of the silica is heat-treated in order to adjust the water content (to increase the $SiO_2$ concentration) in addition to adjusting the porosity of the hydrogel, thereby to obtain a silica hydrogel having an $SiO_2$ concentration of not smaller than 5%.

The heat treatment is effected at a temperature of, desirably, from 100 to 170° C. in, for example, an autoclave.

The silica hydrogel after the heat treatment is washed with water, coarsely pulverized to have a diameter of generally from 20 to 100 μm, formed into the above-mentioned silica hydrosol slurry having an $SiO_2$ concentration of from 15 to 25% by weight, and is wet-pulverized under high-speed shearing.

The wet-pulverization is carried out preferably by using a widely known frictional inner plate mill (such as DYNO-MILL manufactured by WILLY A. BACHOFEN AG). It is of course allowable to use any other wet-type pulverizer provided it is capable of executing high-speed shearing. In this case, it is important that the slurry temperature does not exceed 50° C. from the standpoint of decreasing the aggregation among the particles.

(Preparation of Amorphous Silica Particles of a Double Structure)

According to the present invention, the alkali silicate aqueous solution and the mineral acid aqueous solution are neutralized under the condition of a pH of from 2 to 7 in the presence of gel-method amorphous silica particles wet-pulverized as described above, so that the precipitation-method amorphous silica particles are precipitated on the surfaces of the gel-method amorphous silica particles.

As will be described later, the precipitation-method amorphous silica is formed by reacting the sodium silicate with a mineral acid such as hydrochloric acid, nitric acid or sulfuric acid in a dense alkali metal salt solution.

In this case, alkali metal salts of an inorganic acid or an organic acid can be used in a single kind or in a combination of two or more kinds as the alkali metal salt solution.

When the alkali metal salts are used in such a combination as to favorably precipitate the amorphous silica giving advantage in cost and forming a table salt as a starting material of silicic acid and acid component, it is allowed to repetitively use these alkali metal salts in the form of a metal salt solution.

Upon simultaneously pouring sodium silicate and hydrochloric acid into a dense saline aqueous solution, the silica is formed due to the double decomposition reaction. In the step of this reaction, the pH value must be controlled. While the sodium silicate and hydrochloric acid are being poured, the pH is maintained to be from 2 to 7 and, particularly, from 3.5 to 6. After the simultaneous pouring has finished, the pH is maintained to be from 2 to 5 to effect the ripening. At the start of the simultaneous pouring, it is desired that the saline aqueous solution has a concentration of generally from 5 to 30% by weight and, particularly, from 13 to 18% by weight. At the end of the simultaneous pouring, it is desired that the silica concentration is from 1 to 20% by weight. It is desired that the temperature of the reaction during the simultaneous pouring is from 50 to 100° C. and that the reaction based on the simultaneous pouring terminates in 3 to 20 hours. After the end of the simultaneous pouring, the ripening should be effected at a temperature of from 60 to 100° C. for about 30 minutes to about 25 hours. The formed silica is separated from the mother liquor, washed with water, dried and, as required, is classified to obtain a product.

[Use]

Owing to the above-mentioned properties, the amorphous silica particles of the present invention are particularly useful as a delustering agent for coating materials.

The amorphous silica particles of a double structure of the present invention have a feature in that the volume concentration of the delustering pigment (ml/g of the resin) defined by the following formula (1), $$GPV = P/100 \, Pa \tag{1}$$

wherein P is the amount in grams of the delustered pigment added per 100 g of the coating material resin necessary for satisfying a refractive index of 50% at 60° gloss, and Pa is a slack apparent density (g/ml) of the delustered pigment, is from 0.10 to 0.20. Here, the slack apparent density is based on the Japanese Industrial Standard (JIS-K-5101) and can be measured by Bulk Density Measuring Machine (manufactured by Kuramochi Kagaku Kikai Seisakusyo Co.).

The volume concentration (GPV) of the delustered pigment defined by the above formula (1) represents the volume of the delustering agent that effectively acts for delutering per the number of grams of the resin in the coated film that is formed. As will become obvious from Examples appearing later, in the case of the conventional bulky amorphous silica-type delustering agent, the volume concentration (GPV) is as large as from 0.21 to 0.50 ml/g of the resin. In the case of the present invention, on the other hand, the volume concentration (GPV) is from 0.10 to 0.20 ml/g of the resin, from which it will be obvious that the volume of the delustering agent necessary for achieving the same delustering level is decreased to a very small value compared with that of the conventional silica-type delustering agent.

The amorphous silica particles used in the present invention can be covered or treated on their surfaces with an inorganic oxide such as titanium oxide, silicon oxide, zirconium oxide, zinc oxide, barium oxide, magnesium oxide, or calcium oxide, or with a coupling agent of the type of silane, titanium or zirconium.

As required, furthermore, the particulate amorphous silica can be coated with a metal soap, a resin acid soap, various resins or waxes. In particular, the treatment with an olefin resin wax such as polyethylene wax, oxidized polyethylene wax or acid-modified polyethylene wax, or with a wax such as animal wax, plant wax or mineral wax, is effective in increasing the delutering effect and in improving resistance against scars. The treatment of coating can be easily effected by adding an aqueous emulsion of a wax to an amorphous silica cake after it has been washed with water. It is desired that the surface is treated with 1 to 20 parts by weight of a wax per 100 parts by weight of the amorphous silica particles.

In the present invention, the above-mentioned porous silica can be used for the coating material in combination with other filler or pigment in addition to being used alone as a delustering agent. The inorganic components that can be used in combination include alumina, attapulgite, kaolin, carbon black, graphite, fine powdery silicic acid, calcium silicate, diatomaceous earth, magnesium oxide, magnesium hydroxide, aluminum hydroxide, slate powder, sericite, flint, calcium carbonate, talc, feldspar powder, molybdenum disulfide, barite, vermiculite, whiting, mica, agalmatolite clay, gypsum, silicon carbide, zircon, glass beads, pumice balloon, asbestos, glass fiber, carbon fiber, rock wool, slag wool, boron whisker, stainless steel fiber, titanium white, zinc flower, red iron oxide, iron black, yellow iron oxide, zeolite, hydrotalcite, lithium, aluminum, carbonate, titanium yellow, chromium oxide green, ultramarine, prussian blue, etc.

The amorphous silica particles of the present invention can be blended in a known coating material so as to be used as a delustered coating material composition.

Examples of the coating material include widely known coating materials such as oil coating material, nitrocellulose coating material, alkyd resin coating material, aminoalkyd coating material, vinyl resin coating material, acrylic resin coating material, epoxy resin coating material, polyester resin coating material and chlorinated rubber-type coating material, as well as those coating materials containing one or two or more of rosin, ester gum, pentaresin, cumarone-indene resin, phenol resin, modified phenol resin, malein resin, alkyd resin, amino resin, vinyl resin, petroleum resin, epoxy resin, polyester resin, styrene resin, acrylic resin, silicone resin, rubber-based resin, chloride resin, urethane resin, polyamide resin, polyimide resin, fluorine-contained resin, and natural or synthetic Japanese lacquer.

Depending upon the use, the coating material may be in any form such as solvent-type coating material, aqueous coating material, ultraviolet ray-curable coating material or powdery coating material. Among them, the present invention is particularly suited for the solvent-type coating material and aqueous coating material.

Examples of the organic solvent for the solution-type coating material include aromatic hydrocarbon solvents such as toluene and xylene; aliphatic hydrocarbon solvents such as n-heptane, n-hexane and Isopar; alicyclic hydrocarbon solvents such as cyclohexane and the like; ketone solvents such as acetone, methyl ethyl ketone, methyl isobutyl ketone, and cyclohexanone; alcohol solvents such as ethanol, propanol, butanol, and diacetone alcohol; ether solvents such as tetrahydrofurane and dioxane; cellosolve solvents such as ethyl cellosolve and butyl cellosolve; ester solvents such as ethyl acetate and butyl acetate; and non-protonic polar solvents such as dimethyl formamide, dimethyl acetamide and dimethyl sulfoxide, which can be used in one kind or in two or more kinds. The concentration of resin components in the starting solution is generally from 5 to 70% by weight and, particularly, from 10 to 60% by weight.

As the aqueous coating material, there can be used a coating material of the type of aqueous solution as well as a coating material of the self-emulsified type or of the type emulsified with a surfactant. As the resin for the aqueous coating material, there can be exemplified alkyd resin, polyester resin, acrylic resin or epoxy resin solubilized or self-emulsified in an aqueous medium, which may be used in a combination of two or more kinds. In the self-emulsified resin, the carboxyl group is neutralized with ammonia or amines, or the amine contained therein is quaternalized to impart self-emulsifying property. There can be further used a variety of latex resins. The concentration of the resin component is generally from 10 to 70% by weight and, particularly, from 20 to 60% by weight.

As the ultraviolet ray (UV)-curable coating material, there can be used high-solid resins such as UV-curable acrylic resin, epoxy resin, vinyl urethane resin, acrylic urethane resin or polyester resin in a single kind or in a combination of two or more kinds.

As the powdery coating material, there can be exemplified thermoplastic resins such as polyamide, polyester, acrylic resin, olefin resin, cellulose derivative, polyether and vinyl chloride resin, as well as resins such as epoxy resin, epoxy/novolak resin, isocyanate or epoxy-curable polyester resin.

According to the present invention, the above-mentioned delustering agent is added to the above-mentioned coating material so that the volume concentration (ml/100 g of resin) of the delustered pigment defined by the above-mentioned formula (1) is from 0.10 to 0.20. This makes it possible to impart a high degree of delustering effect to the surface of the coated film despite of the blending in a small amount.

The amorphous silica particles of the present invention are further useful as a filler and, particularly, as an antiblocking agent for the thermoplastic resins, thermosetting resins or various rubbers. That is, the amorphous silica particles of the present invention exhibit an equilibrium water content that is suppressed to a relatively low range at a relatively high humidity, exhibit low hygroscopic property without developing foaming and are, hence, free from developing color due to adsorption relative to other additives, do not lose properties of the additives, and serves as an excellent blending agent and, particularly, as an antiblocking agent for the resin films. Moreover, the amorphous silica particles of the present invention do not adsorb water vapor at a large rate but exhibit sustained property for adsorbing water vapor. Thus, the amorphous silica particles can be used as a hygroscopic agent for the resins, exhibiting stable and sustained hygroscopic property. That is, the amorphous silica particles do not quickly adsorb water but does not release water that is once adsorbed. Accordingly, the amorphous silica particles are particularly useful as a hygroscopic agent for resins, absorbing moisture in a package or trapping water that permeates through a container.

As the thermoplastic resin that can be blended with the antiblocking agent comprising the amorphous silica particles of the present invention, there can be preferably used olefin resins, such as low-, medium- or high-density polyethylene, isotactic polypropylene, syndiotactic polypropylene, or a polypropylene polymer which is a copolymer with these ethylenes or α-olefin, linear low-density polyethylene, ethylene/propylene copolymer, polybutene-1, ethylene/butene-1 copolymer, propylene/butene-1 copolymer, ethylene/propylene/butene-1 copolymer, ethylene/vinyl acetate copolymer, ionically crosslinked olefin copolymer (ionomer), and ethylene/acrylic acid ester copolymer, which may be used alone or being blended together in two or more kinds. The amorphous silica particles of the present invention is useful as an antiblocking agent for the olefin resin films prepared by using a metallocene catalyst, and are capable of eliminating coloring tendency that could be seen in the conventional antiblocking agents.

The antiblocking agent of the present invention can be further blended into any other known resin films such as polyamides like nylon 6, nylon 6-6, nylon 6-10, nylon 11 and nylon 12; thermoplastic polyesters like polyethylene terephthalate and polybutylene terephthalate; as well as polycarbonate, polysulfone, vinyl chloride rein, vinylidene chloride resin and vinyl fluoride resin.

When used as an antiblocking agent, it is desired that the amorphous silica particles are used in an amount of from 0.005 to 10 parts by weight, preferably, from 0.05 to 3.0 parts by weight and, more preferably, from 0.05 to 1.0 parts by weight per 100 parts by weight of the thermoplastic resin. The amorphous silica particles of the present invention can be blended as a filler into the above-mentioned thermoplastic resins, various rubbers or thermosetting resins, as a matter of course.

As the elastomer polymer for rubbers, there can be exemplified nitrile/butadiene rubber (NBR), styrene/butadiene rubber (SBR), chloroprene rubber (CR), polybutadiene (BR), polyisoprene (IIB), butyl rubber, natural rubber, ethylene/propylene rubber (EPR), ethylene/propylene/diene rubber (EPDM), polyurethane, silicone rubber and acrylic rubber; as well as thermoplastic elastomers such as styrene/butadiene/styrene block copolymer, styrene/isoprene/styrene block copolymer, hydrogenated styrene/butadiene/styrene block copolymer, and hydrogenated styrene/isoprene/styrene block copolymer.

As the thermosetting resin, there can be exemplified phenol/formaldehyde resin, furan/formaldehyde resin, xylene/formaldehyde resin, ketone/formaldehyde resin, urea formaldehyde resin, melamine/formaldehyde resin, alkyd resin, unsaturated polyester resin, epoxy resin, bismaleimide resin, triallyl cyanulate resin, thermosetting acrylic resin, and silicone resin, which may be used in a combination of two or more kinds.

When used as a filler, the amorphous silica particles of the present invention can be blended in an amount of from 0.5 to 20 parts by weight and, particularly, from 2 to 10 parts by weight per 100 parts by weight of the thermoplastic resin, thermosetting resin or elastomer.

When used as a hygroscopic filler, the amorphous silica particles of the present invention can be blended in an amount of from 0.5 to 20 parts by weight and, particularly, from 2 to 10 parts by weight per 100 parts by weight of the thermoplastic resin, thermosetting resin or elastomer, depending upon the object.

Moreover, the amorphous silica of the present invention can be used for any other uses of an amorphous silica such as coating agent for paper, chromatograph carrier, base agent for cosmetics, coating material for electronic parts, hygroscopic agent for electronic parts, etc.

EXAMPLES

The present invention will now be described in detail by way of Examples. The delustering agent and the like agents used in the present invention were measured for their properties and were evaluated in a manner as described below.

(1) Particle Distribution

Measured based on the Coulter counter method (model TA-II, manufactured by Coulter Electronics Co.) by using a 50-μm aperture tube.

(2) Specific Surface Area, Porous Volume

Measured based on the BET method by using Sorptomatic Series 1800 manufactured by Carlo Erba Co.

(3) Method of Testing Delustering Effect

A baked melamine coating material (Amirak #1400 manufactured by Kainsai Paint Co.) was use as a coating agent. A sample of delustering agent was added in an amount of 5 parts by weight to 100 parts by weight of this coating material and was dispersed therein by using a dispersing device (Disper) at 2500 rpm for 5 minutes. Then, by using a bar coater #14, the mixture was applied onto a mirror-coated paper, left to stand at room temperature for 20 minutes, and was baked at 140° C. for 20 minutes to prepare a coated plate. Then, 60° gloss (gloss factor %) was measured by using a digital glossmeter GM-3D manufactured by Murakami Shikisai Gijutsu Kenkyujo Co.

(4) Method of Testing Precipitation in the Resin

A two-liquid-type polyurethane resin (normally dry Retan Clear No. 2026, manufactured by Kansai Paint Co.) was diluted with a special thinner, and its viscosity was adjusted by using No. 4 Ford Cup. 100 Grams of the thus diluted resin was weighed into a 200-ml beaker, 3.0 g (2.91% by weight) of the sample of the delustering agent was added thereto and was dispersed therein by using a Disper at 2500 rpm for 10 minutes. After the dispersion, the mixture slurry was left to stand in a 100-ml graduated colorimetric tube. After 30 days from the start of standing still, the state of precipitation was photographed. Then, the calorimetric tube was shook to disperse the slurry again, and the precipitation was evaluated as follows:

Precipitation: re-dispersion

○: the formed precipitate dispersed again when slightly shook.

Δ: the formed precipitate dispersed again when strongly shook.

X: the formed precipitate did not disperse again despite it is strongly shook.

(5) Abrasion Testing (Resistance Against scars)

A test piece 1 (paper cut into 3×3 cm) and a test piece 2 (paper cut into 20×4 cm) were prepared from the coated paper obtained in (3) above, the test piece 2 was secured with its coating being faced upward onto a glass plate, and the test piece 1 was placed thereon in a manner that the film faces the test piece 2. At this moment, a weight of 900 g was placed on the test piece 1 so that a load of 100 g was exerted per 1 cm². Then, the test piece 1 was moved from an end to an end on the test piece 2, and the abraded surface state of the coated plate was observed. The scars on the coated film were observed by eyes and evaluated after the abrasion was effected 5, 15 and 25 times (reciprocally abraded each time). Evaluation by eyes:

| Order of evaluation | Streaks | Spots |
| --- | --- | --- |
| 1 | slightly seen | no |
| 2 | clearly seen | no |
| 3 | clearly seen | 30–70% of the whole |
| 4 | clearly seen | more than 70% of the whole |

Example 1

(First Step)

Into a 500-liter stainless steel container were introduced 86 kg of sodium silicate No. 3 ((JIS K 1408-66(No.3); $SiO_2$ concentration of 22%)) and 253 kg of water, and the mixture was heated up to 35° C. with stirring. After the temperature was raised, sulfuric acid was one-way poured thereto until the pH was 2.5 thereby to obtain a gel-method amorphous silica sol. After the addition has been finished, the ripening was effected for 5 hours. After the ripening has been finished, the wet-pulverization was effected by using a MYCOLLOIDER.

(Second Step)

60 Kilograms of the gel-method amorphous silica sol (SiO$_2$ content of 3 kg) obtained in the above-mentioned first step was weighed and introduced into a 150-liter stainless steel container and was heated up to 85° C. with stirring. After the temperature was raised, 13.6 kg of the sodium silicate No. 3 diluted into a silica concentration of 13% was poured at a rate of 0.35 L/min and, at the same time, 7% sulfuric acid was poured for 30 minutes in a manner that the reaction pH was 7.5. After the simultaneous addition has been finished, the ripening was effected for 30 minutes. After the ripening, sulfuric acid was poured to adjust the pH to be 3.5.

After the pH was adjusted, the filtering and washing were effected to obtain a cake. Thereafter, the filtered cake was dried, pulverized and classified to obtain amorphous silica particles having a double structure. Table 1 shows the properties and the evaluated results of the obtained powder.

Example 2

The procedure was carried out in the same manner as in Example 1 but using the gel-method amorphous silica sol obtained in the second step of Example 1 in an amount of 90 kg (SiO$_2$ content of 4.5 kg). Table 1 shows the properties and the evaluated results of the obtained powder.

Example 3

The procedure was carried out in the same manner as in Example 1 but using the gel-method amorphous silica sol obtained in the second step of Example 1 in an amount of 40 kg (SiO$_2$ content of 2 kg). Table 1 shows the properties and the evaluated results of the obtained powder.

Example 4

The procedure was carried out in the same manner as in Example 1 but adjusting the reaction pH to be 6 in precipitating the precipitation-method amorphous silica particles in the second step in Example 1. Table 1 shows the properties and the evaluated results of the obtained powder.

Example 5

The procedure was carried out in the same manner as in Example 1 but adjusting the reaction temperature to be 70° C. in precipitating the precipitation-method amorphous silica particles in the second step in Example 1. Table 1 shows the properties and the evaluated results of the obtained powder.

Example 6

A low-molecular polypropylene wax emulsion (UMEX EM-100 manufactured by Sanyo Kasei Co.) was added to the cake that has been filtered and washed in the second step in Example 1, in such a manner that the amount of the polypropylene wax in pure form was 10 parts by weight per 100 parts by weight of the silica, thereby to obtain a surface-treated amorphous silica. Table 1 shows the properties and evaluated results of the obtained powder.

Example 7

The procedure was conducted in the same manner as in Example 1 but raising the temperature to 45° C. in the first step in Example 1. Table 1 shows the properties and evaluated results of the obtained powder.

Example 8

A polyethylene wax emulsion (Hi-Wax 110P manufactured by Mitsui CHEMICALS, Inc.) was added to the cake that has been filtered and washed in the second step in Example 7, in such a manner that the amount of the polyethylene wax in pure form was 15 parts by weight per 100 parts by weight of the silica, thereby to obtain a surface-treated amorphous silica. Table 1 shows the properties and evaluated results of the obtained powder.

Example 9

The procedure was conducted in the same manner as in Example 1 but raising the temperature to 25° C. in the first step in Example 1. Table 1 shows the properties and evaluated results of the obtained powder.

Example 10

A polyethylene wax emulsion (PARMARIN manufactured by Sanyo Kasei Co.) was added to the cake that has been filtered and washed in the second step in Example 9, in such a manner that the amount of the polyethylene wax in pure form was 5 parts by weight per 100 parts by weight of the silica, thereby to obtain a surface-treated amorphous silica. Table 1 shows the properties and evaluated results of the obtained powder.

Comparative Example 1

The procedure was conducted in the same manner as in Example 1 but adjusting the reaction pH to be 4 in precipitating the precipitation-method amorphous silica particles in the second step in Example 1. Table 2 shows the properties and evaluated results of the obtained powder.

Comparative Example 2

A commercially available gel-type silica (Sylicia #350 manufactured by Fuji Silicia Co.) was measured for its properties and was evaluated. The results were as shown in Table 2.

Comparative Example 3

A commercially available precipitation-method silica (Mizukasil P-526 manufactured by Mizusawa Industrial Chemicals, Ltd.) was measured for its properties and was evaluated. The results were as shown in Table 2.

Comparative Example 4

The silica powders of Comparative Example 2 and Comparative Example 3 were mixed together at a weight ratio of 1:1 to measure and evaluate the properties. The results were as shown in Table 2.

TABLE 1

| Example No. | 1 | 2 | 3 | 4 | 5 | 6 | 7 | 8 | 9 | 10 |
|---|---|---|---|---|---|---|---|---|---|---|
| Average particle diameter (μm) | 2.5 | 2.5 | 2.5 | 2.5 | 2.5 | 2.5 | 2.0 | 2.0 | 3.0 | 3.0 |
| Specific surface area (m²/g) | 180 | 200 | 175 | 210 | 198 | 170 | 210 | 195 | 170 | 160 |
| Porous volume (ml/g) | 0.6 | 0.7 | 0.6 | 0.8 | 0.7 | 0.6 | 0.7 | 0.7 | 0.6 | 0.6 |
| Delustering property (%) | 15 | 15 | 16 | 16 | 15 | 15 | 16 | 15 | 15 | 15 |
| Precipitating property | Δ | Δ | Δ | Δ | Δ | ○ | ○ | ○ | Δ | Δ |
| Abrasion testing | | | | | | | | | | |
| 5 times | 1 | 1 | 1 | 1 | 1 | 1 | 1 | 1 | 1 | 1 |
| 15 times | 1 | 1 | 1 | 1 | 1 | 1 | 1 | 1 | 1 | 1 |
| 20 times | 2 | 2 | 2 | 2 | 2 | 2 | 2 | 2 | 2 | 2 |

TABLE 2

| | Comparative Example No. | | | |
|---|---|---|---|---|
| | 1 | 2 | 3 | 4 |
| Average particle diameter (82 m) | 2.5 | 2.2 | 3.0 | 2.7 |
| Specific surface area (m²/g) | 460 | 250 | 140 | 200 |
| Porous volume (ml/g) | 1.0 | 1.4 | 0.5 | 0.9 |
| Delustering property | 27 | 25 | 18 | 20 |
| Precipitating property | X | Δ | Δ | Δ |
| Abrasion testing | | | | |
| 5 times | 1 | 1 | 1 | 1 |
| 15 times | 1 | 3 | 3 | 3 |
| 25 times | 2 | 4 | 4 | 4 |

According to the present invention, an alkali silicate aqueous solution and a mineral acid aqueous solution are neutralized under a condition of a pH of from 2 to 10 to prepare a gel-method amorphous silica which is, then, wet-pulverized. Then, the alkali silicate aqueous solution and the mineral acid aqueous solution are neutralized in the presence of the wet-pulverized silica particles under a condition of a pH of from 5 to 9 thereby to prepare an amorphous silica having a double structure of a core of the dense amorphous silica and a shell of the bulky amorphous silica, having a volume-based median diameter of from 1 to 10 μm and containing not more than 10% by volume of fine particles of a diameter of not larger than 0.5 μm.

The amorphous silica particles having a double-wall structure maintain constant particle diameters not only in the powdery state but also in a state where the particles are blended in a coating material or in a resin, without developing fine particles, exhibiting excellent delustering action and antiblocking action, exhibiting decreased abrading property, and exhibiting excellent resistance against scars or abrasion.

What is claimed is:

1. A process for preparing amorphous silica particles having a double structure comprising a core of dense particle and a shell of bulky particles, said amorphous particles having an average particle diameter of 2–5 microns and having not more than 10% by volume of particles having a diameter of not larger than 0.5 microns; said process comprising:

a step of neutralizing an alkali silicate aqueous solution and a mineral acid aqueous solution under a condition of a pH of from 2 to 10 to prepare gel-method amorphous silica;

a step of wet-pulverizing the thus formed gel-method amorphous silica; and step of neutralizing the alkali silicate aqueous solution and the mineral acid aqueous solution in the presence of the wet-pulverized gel-method amorphous silica particles under a condition of a pH of from 5 to 9, so that the precipitation-method amorphous silica particles are precipitated on the surfaces of the gel-method amorphous silica particles.

2. A process according to claim 1, wherein the gel-method amorphous silica particles are prepared at a temperature of not higher than 50° C.

3. A process according to claim 1, wherein the gel-method amorphous silica is wet-pulverized so that the volume-based median diameter becomes from 0.5 to 3 μm.

4. A process according to claim 1, wherein the precipitation-method amorphous silica particles are precipitated at a temperature of from 60 to 100° C.

* * * * *